United States Patent [19]

Ellingson

[11] Patent Number: 4,677,291
[45] Date of Patent: Jun. 30, 1987

[54] ANALYSIS OF ROTATIONAL ECCENTRICITY

[75] Inventor: David I. Ellingson, Newton, Iowa

[73] Assignee: The Maytag Company, Newton, Iowa

[21] Appl. No.: 797,689

[22] Filed: Nov. 13, 1985

[51] Int. Cl.[4] ............................................. G01C 19/02
[52] U.S. Cl. ................................ 250/231 GY; 68/23.1
[58] Field of Search .................... 33/108, 185; 73/460, 73/462; 250/231 GY; 324/175; 68/23.1, 23.2, 23.3; 250/231 SE

[56] References Cited

U.S. PATENT DOCUMENTS

| | | | |
|---|---|---|---|
| 3,585,877 | 6/1971 | Kass | 250/231 GY X |
| 4,321,580 | 3/1982 | Deleris | 340/870.24 |
| 4,339,959 | 7/1982 | Klaus, Jr. et al. | 250/231 GY X |
| 4,342,025 | 7/1982 | Spalti et al. | 340/347 P |
| 4,445,087 | 4/1984 | Mehnert | 324/175 |

Primary Examiner—Eugene R. LaRoche
Assistant Examiner—Steven J. Mottola
Attorney, Agent, or Firm—Richard L. Ward

[57] ABSTRACT

A laundry appliance includes apparatus for analyzing the eccentricity of a rotatable member with respect to its design rotational axis when subjected to dynamic unbalance forces. An indicator is rotatable with the rotatable member and includes a predetermined detectable pattern. A sensor is juxtaposed to the detectable pattern and is spaced a predetermined radial distance from the design rotational axis of the rotatable member and indicator. The sensor is cooperable with the detectable pattern for producing an electrical signal corresponding to passage of the detectable pattern during rotary movement of the indicator to generate a stream of electrical signals representing the relative degree of radial displacement of the rotatable member from the design rotational axis. Control apparatus includes a microcontroller in circuit association with the sensor. The microcontroller is operable for receiving and analyzing the stream of electrical signals from the sensor for determining the radial displacement of the rotatable member from the design rotational axis by analyzing changes in the stream of electrical signals.

11 Claims, 9 Drawing Figures

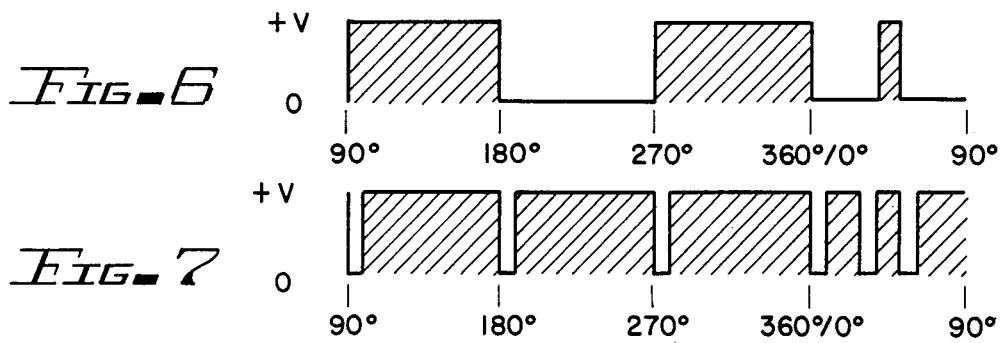
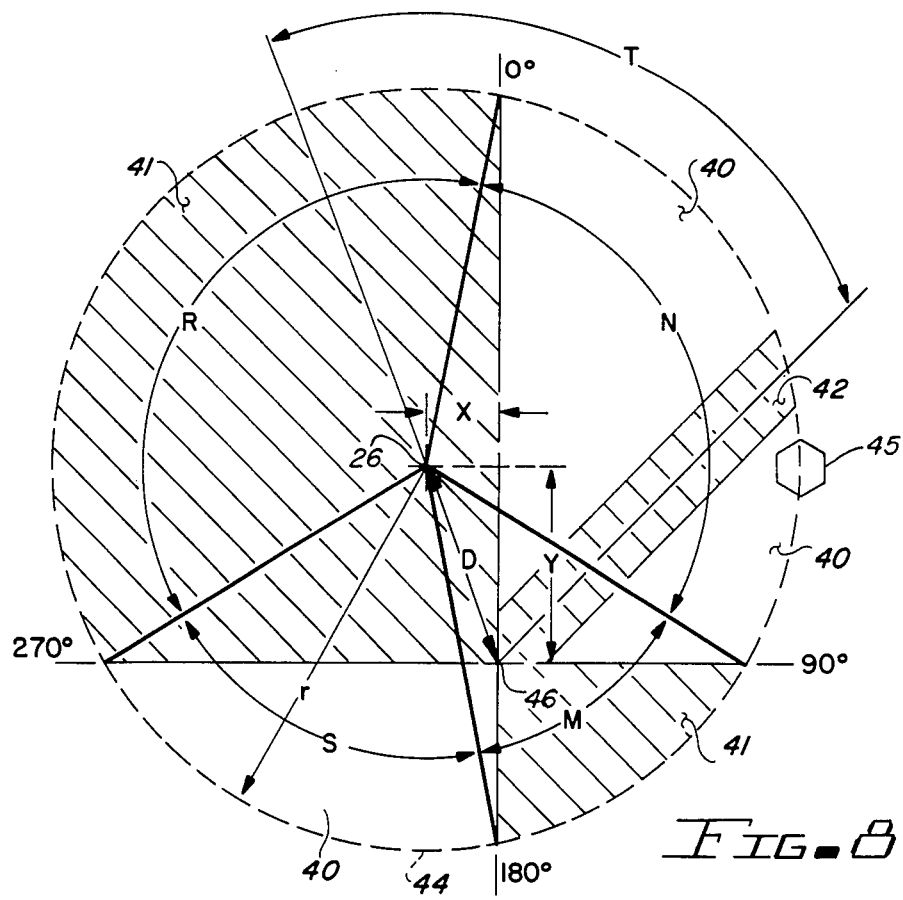
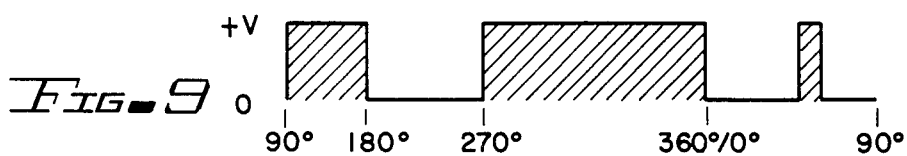

ANALYSIS OF ROTATIONAL ECCENTRICITY

BACKGROUND OF THE INVENTION

This invention relates generally to apparatus for analyzing the rotational movement of a shaft or other rotatable member and in particular to apparatus for analyzing the eccentricity of that rotatable member from the normal rotational axis.

In apparatus having a rotatable member and including computer disk drives and automotive tachometers, for example, there have been shown a number of arrangements for determining the angular velocity and/or the angular position of a rotating member.

Deleris, in U.S. Pat. No. 4,321,580 issued Mar. 23, 1982, teaches a method and apparatus for determining the angular position of a point in rotational motion including a disk coupled to rotate with the rotating part. The disk includes a plurality of alternating teeth and spaces about its periphery. At least one tooth is removed to form a reference mark. A transducer located adjacent the disk produces electrical signals representative of the passage of teeth and spaces past the transducer. From the signals the instantaneous angular position of the reference mark on the rotating part can be determined.

Spalti et al, in U.S. Pat. No. 4,342,025 issued July 27, 1982, disclose an arrangement for determining the angular position of a movable body. A plurality of concentric tracks are movable with the body past individual detecting locations for the respective tracks. The tracks include markings which are distributed along and among the tracks in a predetermined code. Means is provided for detecting the presence of the markings and for transmitting the signals to a common receiver by individual channels associated with respective detecting locations. The detecting signals are transmitted through the channels chronologically and assigned to respective time or space slots of a binary coded, position-indicating output signal by means of a control signal generated at a predetermined instant relative to the sequence of detecting signals.

Mehnert, in U.S. Pat. No. 4,445,087 issued Apr. 24, 1984, teaches a disk member and sensor for determining the instantaneous angular velocity of a rotating shaft. The disk includes a plurality of marks approximately equally distributed along the path swept over by the sensor of the sensing unit. The distance relative to time of two electric signals produced by the sensor is measured with regard to two identified marks in a calibrating run and is stored. During operation, the instantaneous time distance of the sensed signals between marks is measured and the instantaneous velocity is obtained by comparing it with the stored calibrating value.

The prior art has thus shown various arrangements for determining the angular velocity as well as the angular position of a rotatable member. These arrangements have included variations of a disk member attached to the rotatable member. The disk members of the various arrangements have included different means of detecting the angular velocity and angular position such as the plurality of teeth and spaces in U.S. Pat. No. 4,321,580, the plurality of tracks and sensors in U.S. Pat. No. 4,342,025, and the approximately equally distributed marks in U.S. Pat. No. 4,445,087. In spite of these many arrangements for determining angular velocity and angular position of a rotatable member, there has been no known showing of the present laundry appliance including apparatus for analyzing the eccentricity of a rotatable member from it normal axis of rotation.

SUMMARY OF THE INVENTION

It is therefore an object of the instant invention to provide improved laundry appliance including apparatus for analyzing the rotational characteristics of a rotatable member. It is a further object of the instant invention to provide a laundry appliance including apparatus for determining the dynamic eccentricity of a rotatable member from its normal axis of rotation.

Briefly, the instant invention achieves these objects in a laundry appliance including apparatus for analyzing the eccentricity of a rotatable member with respect to a design rotational axis thereof when subjected to dynamic unbalance forces. An indicator is rotatable with the rotatable member and includes a predetermined detectable pattern located about the design rotational axis of the rotatable member and the indicator. A sensor is juxtaposed to the predetermined pattern and is spaced a predetermined radial distance from the design rotational axis. The sensor is cooperable with the predetermined detectable pattern for producing an electrical signal corresponding to passage to the predetermined detectable pattern during rotary movement of the indicator to generate a stream of electrical signals representative of the relative degree of radial displacement of the rotatable member from the design rotational axis. A control includes circuitry having a microcontroller in circuit association with the sensor. The microcontroller is operable for receiving and analyzing the stream of electrical signals for determining the radial displacement of the rotatable member from the design rotational axis by analyzing changes in the stream of electrical signals.

Details of the apparatus and further objects and advantages thereof will become evident as the description proceeds and from an examination of the accompanying three sheets of drawings.

BRIEF DESCRIPTION OF THE DRAWINGS

The drawings illustrate a preferred embodiment of the invention with similar numerals referring to similar parts throughout the several views, wherein:

FIG. 6 illustrates a trace of the electrical signal generated by the sensor corresponding to the detectable pattern of FIG. 4 during rotation in a non-eccentric condition;

FIG. 7 illustrates a trace of the electrical signal generated by the sensor corresponding to the detectable pattern of FIG. 5 during rotation in a non-eccentric condition;

FIG. 8 is an enlarged view of a portion of the disk shown in FIG. 4 depicting an eccentric condition of the tub assembly of the automatic washer; and FIG. 9 illustrates a trace of the electrical signal generated by the sensor corresponding to the eccentric condition shown in FIG. 8.

DESCRIPTION OF A PREFERRED EMBODIMENT

Figure 1:
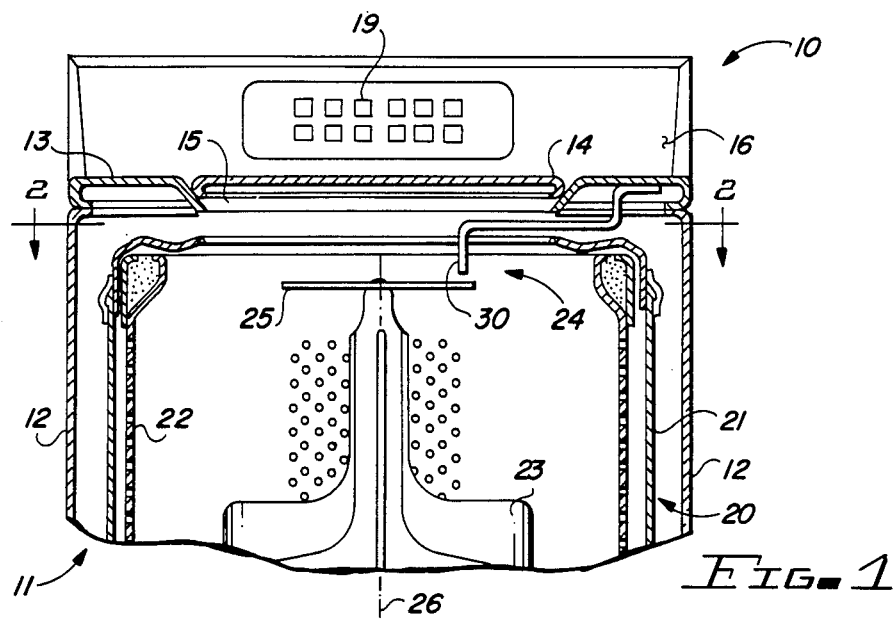
FIG. 1 is a partial front and vertical section view of a top loading automatic washing machine incorporating the apparatus of the instant invention.
Figure 2:
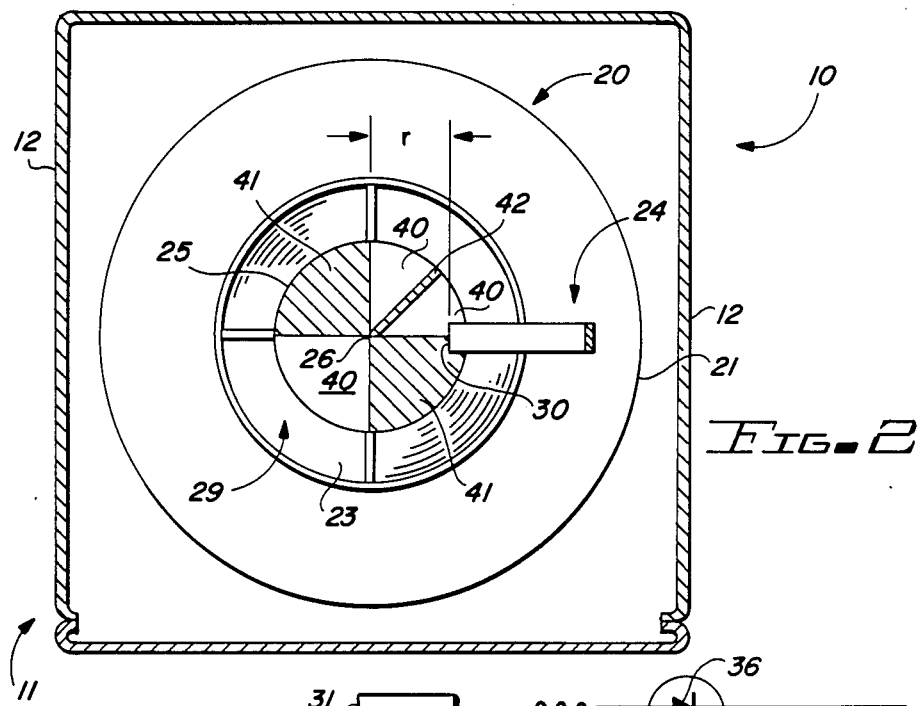
FIG. 2 is a horizontal section view taken generally along lines 2—2 of FIG. 1 and showing a plan view of the apparatus of the instant invention.

Referring now to the drawings and in particular to FIGS. 1 and 2, there is shown a vertical axis automatic washing machine 10 including a cabinet 11 comprising side walls 12 and a top cover 13. The top cover 13 includes a hinged panel comprising an access door or lid 14 normally covering a recessed loading opening 15 and movable to an open position to permit access to the opening 15. The top cover 13 further includes an upwardly extending housing or control panel 16 for accommodating various control members actuatable by touch switches 19 or the like.

Mounted within the cabinet 11 is a tub assembly 20 including a generally imperforate outer liquid container or tub 21. Revolvably mounted in the imperforate outer tub 21 is a perforate clothes basket or fabric container 22 in which is positioned an oscillatable agitator 23 for effecting washing movement of fabrics and washing fluid within the tub assembly 20. The perforate fabric container 22 is rotated at a relatively high speed during portions of a cycle of operations for extracting washing fluid from the fabrics being washed. The imperforate outer tub 21 and the perforate inner fabric container 22 are substantially aligned with the loading opening 15 in the top cover 13 for permitting an operator to place articles within the fabric container 22 and remove them upon completion of a cycle of operations. In the preferred embodiment, the tub assembly 20 is supported on a friction damper assembly (not shown) for nutation about the design rotational axis 26 of the washing machine 10 which corresponds to a vertical axis. In other washer constructions the fabric container may be mounted for lateral movement in a generally horizontal plane.

There is further shown in FIGS. 1 and 2 sensing apparatus 24 attached to the top of the agitator 23 and to the underside of the top cover 13. A disk member or indicator 25 is shown attached to the agitator 23 for movement therewith about the design rotational axis 26 of the washing machine 10. For purposes of the instant invention, the design rotational axis 26 shown in FIGS. 1 and 2 is the substantially vertical centerline of the washing machine 10. As best shown in FIG. 2, the top surface of the disk member or indicator 25 includes a predtermined detectable pattern 29 which is arranged about the design rotational axis 26 of the tub assembly 20 in the non-eccentric operation of the washing machine 10 and disk member or indicator 25 and which will be futher described herein. It is noted that although the disk member or indicator 25 shown in the drawings is circular in configuration, this is not to be limiting in scope since the disk member 25 could be any desired geometric shape.

Spaced a predetermined distance "r" from the design rotational axis 26 of the washing machine 10 and juxtaposed to the surface of the disk member 25 is the substantially vertical centerline of a Honeywell SPC 1405-1 infrared phototransistor sensor 30 or its equivalent which is cooperable with the disk member 25 for generating electrical signals corresponding to the passing of the detectable pattern 29 below the sensor as the fabric container 22 is rotated. The sensor 30 is schematically shown as being attached to the underside of the top cover 13 in FIG. 1. It should be understood, however, that the location shown is only schematic in nature and that numerous other suitable mounting arrangements for the sensor 30 are possible, such as below the tube assembly 20, as well as installation on a horizontal axis washing machine. It is also understood that, in the illustrated embodiment, the disk member 25 and the sensor 30 are removably mounted for accommodating loading and unloading of fabrics through the loading opening 15.

Figure 3:
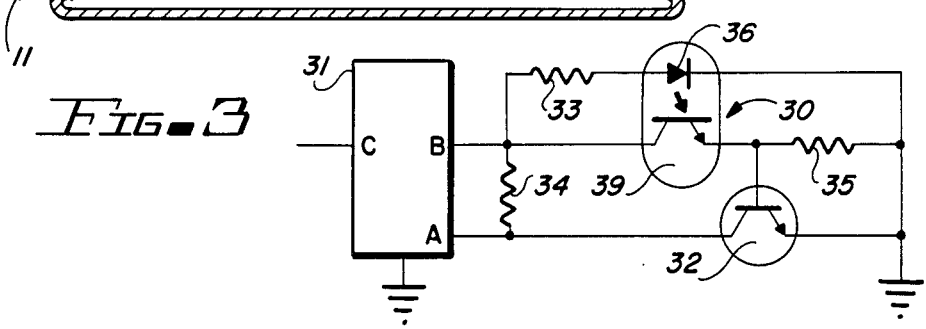
FIG. 3 is a an electrical schematic circuit of the apparatus shown in FIGS. 1 and 2.

Turning now to FIG. 3, there is shown a partial electrical schematic circuit including the snesor 30 as shown in FIGS. 1 and 2. The circuit of FIG. 3 also includes a microcontroller 31 which is also utilized for controlling the various washing cycles of the automatic washing machine 10. Other elements of the circuit include a National Semiconductor 2N3725 transistor 32 or its equivalent and resistors 33, 34 and 35. In a preferred embodiment, the detectable areas of the predetermined detectable pattern 29 on the surface of the disk member 25 are light reflective and to which the phototransistor sensor 30 is responsive. It is further contemplated, however, that other methods of sensing are capable of being utilized such as magnetic and non-magnetic detectable and non-detectable areas along with a compatible sensor device.

Whenever the washing machine 10 is operational, the microcontroller 31 is powered up by supplying power at port C. The microcontroller 31 will provide a 5 volt potential at port B for energizing the phototransistor sensor 30. Briefly, as the disk member 25 revolves below the sensor 30, light emitted by the LED portion 36 of the phototransistor sensor 30 is reflected from the non-crosshatched areas of the disk member 25. This reflected light impinges on the light sensitive base of the transistor portion 39 of the phototransistor 30 providing base current to switch the transistor portion 39 of the phototransistor sensor 30 to an energized condition and allow working current to flow from the collector to the emitter junction. This provides base current to actuate transistor 32. When transistor 32 is actuated, port A of the microcontroller 31 will be pulled or transitioned from a plus 5 volt or high condition to a zero volt or low condition indicating the passage of a light reflecting portion of the detectable pattern 29 of the disk member 25 below the sensor 30. In FIG. 3, resistor 33 is a current limiting resistor for the LED portion 36, resistor 34 is a pull-up resistor which restores port A of the microcontroller 31 to a 5 volt or high configuration when transistor 32 ceases conduction and resistor 35 is a base resistor which prevents transistor 32 from conducting until the phototransistor sensor 30 is conducting.

Figure 4:
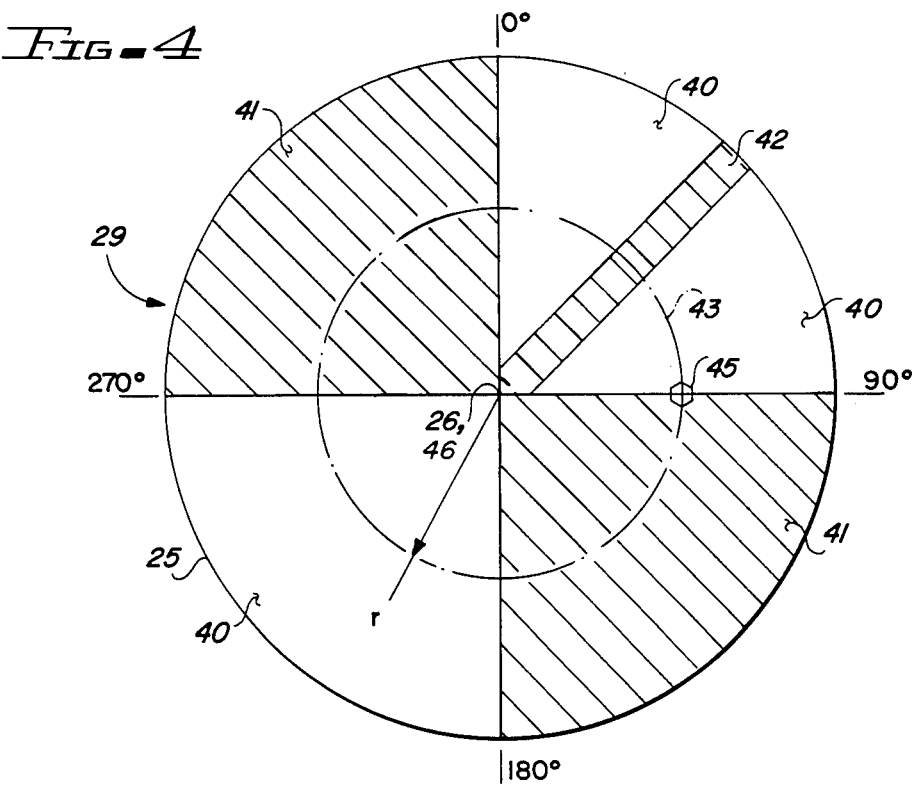
FIG. 4 is an enlarged view of the top of the disk shown in FIG. 2 with a circle superimposed on the detectable pattern depicting a balanced or non-eccentric condition of the tub assembly of the automatic washing machine.

Referring now to FIG. 4, the disk member or carrier 25 of FIGS. 1 and 2 is shown as if it were removed from the environment of washing machine 10. The circular disk member or indicator 25 of FIG. 4 is divided into a predetermined detectable pattern 29 of quadrants or angular sectors of reflective and non-reflective areas 40 and 41 with the non-reflective areas 41 shown crosshatched. While the areas are referred to as "reflective" and "non-reflective" or "detectable" and "non-detectable" areas 40 and 41, these terms are used for relative identification and should be taken as including also areas which differ in their degree of reflectance or other detectable characteristic so that a transition can be detected by the phototransistor sensor 30 or other sensor. Located between the 0 and 90 degree positions on the surface of the disk member 25 at substantially 45 degrees is a radially extending non-reflecting strip which serves as a locating or indexing mark 42 for the disk member 25.

Superimposed on the surface of the disk member 25 of FIG. 4 is a circle 43 having a radius "r". As previously discussed, the radius "r" represents the fixed predetermined radial distance from the design rotational axis 26 of the washing machine 10 to the center of the phototransistor sensor 30 represented by the hexagonal shape 45 in FIG. 4. The circle 43 superimposed on the disk member 25 represents the path detected by the phototransistor sensor 30 during the sprinning of a balanced fabric container 22 about the design rotational axis 26. It is noted that during the spinning of a balanced fabric container 22 the design rotational axis 26 and the center 46 of the disk member 25 are aligned.

Figure 5:
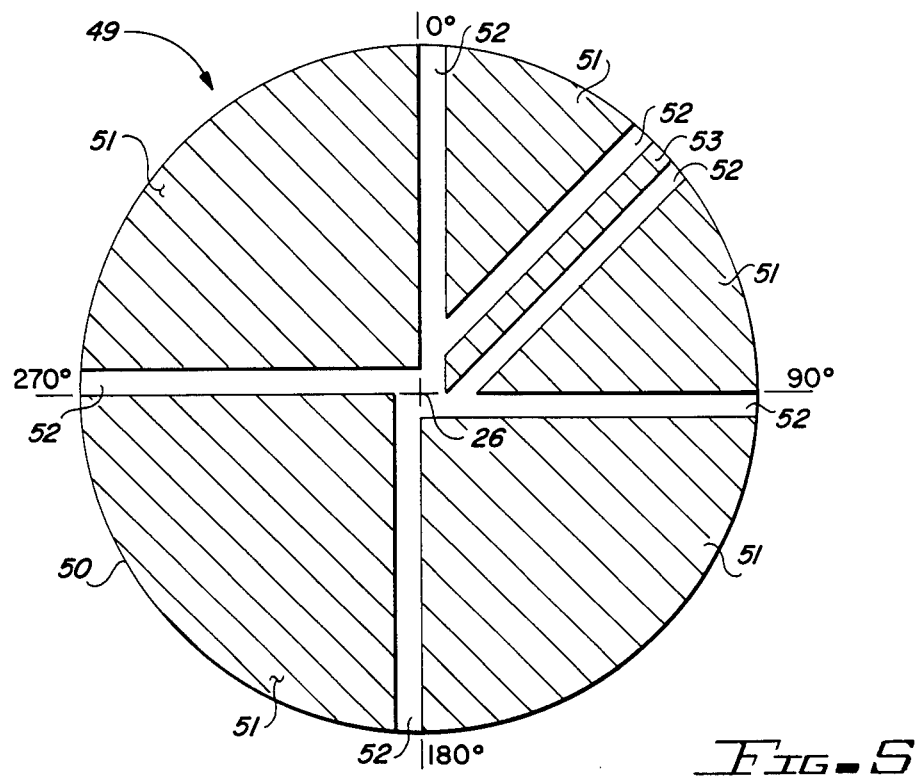
FIG. 5 is a view similar to FIG. 4 showing an alternate embodiment of the detectable pattern.

FIG. 5 is representative of an alternate detectable pattern 49 and disk member 50. In FIG. 5, the cross-hatched areas again represent non-reflective areas 51. As shown, each 90 degree angular sector includes a relatively narrow reflective strip 52. In addition, the angular sector between 0 and 90 degrees includes a pair of narrow reflective strips 52 and a non-reflective strip functioning as an index mark 53 for the disk member 50. As the disk member 50 of FIG. 5 is rotated below the sensor 30, there will be a total of six high to low transitions at microcontroller port A for each complete revolution of the disk member 50.

FIGS. 6 and 7 represent traces of the electrical signals produced by the sensor 30 or the state of port A of the microcontroller 31 as the disk members 25 or 50 of FIGS. 4 and 5 are rotated in a balanced condition. The cross-hatched areas in FIGS. 6 and 7 correspond to the non-reflective areas 41, 42, 51 and 53 in FIGS. 4 and 5. If the disk member 25 of FIG. 4 is rotated about the design rotational axis 26 in a counterclockwise direction as viewed in FIG. 4 starting from the location of the sensor 30 or the 90 degree position, the output or signal at port A of the microcontroller 31 will be represented by FIG. 6. Initially, the sensor 30 will be in a non-conductive state and port A of the microcontroller 31 will be configured high or at five volts. At 180 degrees the sensor 30 will change to a conductive or sensing state and port A of the microcontroller 31 will transition to a low or zero voltage state through the angular sector from 180 to 270 degrees. The angular sector between 270 and 360 or 0 degrees of the predetermined detectable pattern 29 on the disk member 25 is a non-reflective area 41 and port A of the microcontroller 31 will be configured high or at a plus 5 volts throughout this sector. Between 0 and approximately 45 degrees the sensor 30 will be in a conductive or sensing state and port A of the microcontroller 31 will be configured low or at zero volts. At approximately 45 degrees the sensor 30 will change to a non-conductive state and port A will briefly transition to a high state indicative of the index mark 42. Between the index mark 42 and the 90 degree location, port A of the microcontroller 31 will again be transitioned to a low state representative of a conductive sensor 30.

FIG. 7 shows that as the disk member 50 of FIG. 5 is rotated in a counterclockwise direction below the sensor 30 beginning at the 90 degree position there will be six definite and repetitive high to low voltage transitions at port A of the microcontroller 31 for each revolution of the balanced fabric container 22. The predetermined detectable pattern 29 or 49 for each disk member 25 or 50 thus provides a recognizable repeating pattern for a balanced or normal operating condition.

As the fabric container 22 is rotated in a counterclockwise direction about the design rotational axis 26, such as during an extraction operation, the disk member 25 is rotated therewith. The predetermined detectable pattern 29 on the disk member 25 rotates with respect to the stationary sensor 30 and the sensor 30 will detect the reflective areas 40 and energize transistor 32 accordingly to transition port A of the microcontroller 31 from a high to a low state. For purposes of illustration, a low state at port A can be considered a logic 0 and a high state can be considered a logic 1. Thus, for each revolution of the disk member 25, there will be a stream of electrical signals at port A representative of whether or not the sensor 30 detects a reflective surface during the time frame in which the microcontroller 31 checks port A. As previously discussed, for a balanced condition of the fabric container 22 the stream of electrical signals will be a repetitive pattern as shown by the electrical trace of FIG. 6. For each unbalanced situation it is apparent that a different repetitive pattern of electrical signals will be generated.

Referring now to FIG. 8, for purposes of illustration, a circle 44 of radius "r" depicts the portion of the displaced disk member 25 traced by the sensor 30 with a particular unbalanced condition of the tub assembly 20. The radial displacement of the center 46 of the disk member 25 from the design rotational axis 26 of the washing machine 10 is labeled "D" in FIG. 8 as previously mentioned and a method of determining the displacement "D" as well as the angular orientation T of the design rotational axis 26 with respect to the index mark 42 will be undertaken herein.

In an unbalanced condition the fabric container 22 and disk member 25 best shown in FIGS. 1 and 2 will rotate about an axis identified by the center 46 of the disk member 25 and at any instant, will be displaced from the design rotational axis 26 by the radial distance "D" as shown in FIG. 8. As the unbalanced tub rotates about a displaced axis including center 46, the tub assembly 20 will, however, move nutationally about the design rotational axis 26 and a point on the fabric container 22 will effectively rotate about the design axis 26 as a result of the combined rotation of the container 22 about its displaced axis and the rotation of the displaced axis about the design axis 26. The center 46 of the disk member 25 is displaced from the design rotational axis 26 by the radial distance "D" and in a particular angular direction due to the location of the unbalance mass within the fabric container 22 as it rotates. Since the nutation of the tub assembly 20 about the design rotational axis 26 and the rotation of the fabric container 22 about the displaced axis of the disk member 25 are at the same rotational frequency, the detectable pattern 29 on the disk member 25 will rotate past the sensor 30 as shown by the circle 44 of radius "r" in FIG. 8. The reflective and non-reflective areas 40 and 41 will provide the electrical signal trace shown in FIG. 9 which varies from the electrical signal trace for a balanced condition shown in FIG. 6.

In the drawings the quadrants of the detectable pattern 29 associated with the disk member 25 will be identified as quadrants one through four with quadrant one being between 0 and 90 degrees, quadrant two being between 90 and 180 degrees, quadrant three being between 180 and 270 degrees and quadrant four being between 270 and 360 or 0 degrees. The index mark 42 can be identified as the disk member 25 is rotated by means of a data sorting routine. For example, as the disk member 25 is rotated, the microcontroller 31 identifies the angular sectors of reflective and non-reflective areas 40 and 41 by checking port A for a high or low configuration. With the disk member 25 of FIG. 4, port A will be configured identically, either high or low, for several successive readings corresponding to the approximately 90 degree angular sectors of reflective or non-reflective areas 40 and 41. The index mark 42 represents a very small sector as compared to the other sectors and therefore will produce a corresponding small time period of high configuration at port A of the micro-controller 31. The microcontroller 31 can sort this relatively small time period and thus identify it as the index mark 42.

Once the index mark 42 has been identified, the microcontroller 31 can determine the elapsed time between two consecutive identifications of the index mark 42. If, for example, the elapsed time between identifications of the index mark 42 is 1/10 of a second and port A of the microcontroller 31 is checked or read 2400 times per second during a portion of the operating program, then the disk member 25 is effectively sampled or sensed 240 times per revolution or every 1½ degrees.

Identification of the index mark 42 is not required to determine the radial displacement of the center 46 of the disk member 25 from the design rotational axis 26 as identified by the letter D in FIGS. 4 and 8. For all practical purposes, the displacement D will be considered to be in the same generally horizontal plane as the disk member 25. As further shown in FIG. 8, a right triangle has been laid out between the design rotational axis 26 and the center 46 of the disk member 25. This right triangle has sides X and Y in addition to side D. FIG. 8 further includes a plurality of angular sectors M, N, R and S constructed from the centerline of the design rotational axis 26 and defined by lines extending from the design rotational axis 26 and intersecting circle 44 at the points of intersection of the circle 44 by the vertical and horizontal centerlines of the disk member 25. The circle 44 described by the sensor radius "r" is thus divided into four angular sectors M, N, R and S which are representative of the rotation of the unbalanced circle 44 of FIGS. 4 and 8 with respect to the design rotational axis 26. As the eccentric or radially displaced disk member 25 of FIG. 8 is rotated past the sensor 30 along the path described by radius "r", the predetermined reflective pattern of the disk member will present a repetitive pattern to the sensor 30 which will configure port A of the microcontroller 31 in a different repetitive high-low pattern as compared to the repetitive pattern typical of the balanced circle 43 of FIG. 4. This different repetitive high-low pattern is illustrated in the trace of electrical signals shown in FIG. 9. As previously mentioned, in this particular example, the disk member 25 is sampled or sensed at 1½ degree intervals. Thus, for angle N in quadrant one between 0 and 90 degrees of rotation and disregarding the index mark 42, the sensor 30 will configure port A low. For angles M and S in quadrants two and three between 90 and 270 degrees the sensor 30 will configure port A high and low respectively. For angle R in quadrant four between 270 and 360 or 0 degrees port A will be configured high.

The angles M, N, S and R as shown in FIG. 8 can be determined or computed by the microcontroller 31 by means of a ratio of the number of zeros and ones for the various quadrants. Between 0 and 90 degrees the angle N can be computed as follows: $N = 360 \times 73$ divided by 240. In this equation, 360 equals the number of degrees in a circle, 240 equals the total number of readings or samplings in one revolution of disk member 25 based on 1½ degrees between readings and 73 equals the number of readings in the quadrant between 0 and 90 degrees. The angle N for this example is thus computed as 109 degrees. By the same method angles M, S and R can be computed. These angles are 49, 70 and 132 degrees respectively for the particular unbalance example shown in FIG. 8.

Once the angles M, N, S and R have been calculated, the dimensions X and Y between the design rotational axis 26 and the center 46 of the disk member 25 can be computed by the microcontroller 31 using trigonometric functions. In this particular example, a sensor radius "r" equal to 1.375 inches has been utilized. The dimension $X = -"r" \cosine (N+M/2)$ with the negative sign referring to the direction from the center 46 of the disk member 25. Thus the negative value of X places the design rotational axis 26 in either quadrant three or four between 180 and 0 degrees with respect to the center 46 of the disk member 25. The dimension $Y = "r" \cosine (S+M/2)$. Once X and Y are calculated the dimension D can be computed and is equal to the square root of the quantity $X^2$ plus $Y^2$. In the example of FIG. 8 the dimensions X, Y and D are calculated to be $-0.263$ inches, 0.751 inches and 0.795 inches respectively. The dimension D is representative of the radial displacement of the center 46 of the disk member 25 from the design rotational axis 26.

The angular orientation of the design rotational axis 26 from the index mark 42 represented by angle T in FIG. 8 is computed as follows. The angle T is defined as the angle between a line extending from the design rotational axis 26 to the center 46 of the disk member 25 and the index mark 42 which is known to be oriented at 45 degrees to the center 46 of the disk member 25 in quadrant one. The angle T therefore equals 45 degrees— $-\arctan X/Y$. Thus, in this example, T equals 65 degrees in a counterclockwise direction from the index mark 42.

The example of FIG. 8 thus is representative of one unbalanced condition of the fabric container. There can be a number of unbalanced conditions and in each different situation the microcontroller and sensor of the instant invention can be utilized to calculate the radial and angular displacement of the new spin point. It is also envisioned that the sensor utilized herein would replace the electromechanical unbalance trip systems heretofore utilized in washing machines by halting operation of the washing machine should a predetermined eccentricity at a predetermined speed by exceeded. This action could allow physical reduction in the washing machine cabinet parameters since the previously required large swing clearance for the tub assembly would no longer be necessary. Once the microcontroller of the sensor system has identified the index mark, that index mark can be used for monitoring the angular velocity of the fabric container during an extraction operation. It is further anticipated that upon detection of an unbalanced condition the microcontroller can be programmed to take proper corrective action. An example of proper corrective action might be that of correcting the unbalance as by initiating a signal to effect injecting a quantity of washing fluid and continuing or attempting to continue the cycle of operations.

In the drawings and specification, there has been set forth a preferred embodiment of the invention and although specific terms are employed these are used in a generic and descriptive sense only and not for purposes of limitation. Changes in the form and the proportion of parts as well as the substitution of equivalents are contemplated as circumstances may suggest or render expedient without departing from the spirit or scope of the invention as defined in the following claims.

I claim:

1. A laundry appliance including a stationary housing and a rotatable fabric container for receiving fabrics to be treated and further including apparatus for analyzing the rotational eccentricity of said rotatable fabric container with respect to a design rotational axis thereof when subjected to dynamicly unbalanced forces of unevenly distributed fabrics in said fabric container during rotation thereof, comprising: indicator means rotatable with said rotatable fabric container, said indicator means including a predetermined detectable pattern located about the design rotational axis of said rotatable fabric container and said indicator means; sensor means juxtaposed to said predetermined detectable pattern and spaced a predetermined radial distance from said design rotational axis, said sensor means cooperable with said predetermined detectable pattern for producing an electrical signal corresponding to passage of said predetermined detectable pattern during rotary movement of said indicator means to generate a stream of electrical signals representative of the relative degree of radial displacement of said rotatable fabric container from said design rotational axis and toward said stationary housing; and control means including circuit means having microcontroller means in circuit association with said sensor means, said microcontroller means operable for receiving and analyzing said stream of electrical signals for determining the radial displacement of said rotatable fabric container from said design rotational axis and further operable for controlling rotary movement of said rotatable fabric container responsive to changes in said radial displacement of more than a predetermined distance to limit the maximum rotational eccentricity of said fabric container.

2. Laundry appliance apparatus as defined in claim 1 wherein said predetermined detectable pattern is arranged to divide said indicator means into a first plurality of sectors having a first detectable characteristic and a second plurality of sectors having a second relatively different detectable characteristic.

3. Laundry appliance apparatus as defined in claim 1 wherein said predetermined detectable pattern includes reflective and non-reflective sectors.

4. Laundry appliance apparatus as defined in claim 3 wherein one of said reflective sectors includes a non-reflective portion defining an index mark.

5. Laundry appliance apparatus as defined in claim 4 wherein said microcontroller means includes a data sorting routine for analyzing said stream of electrical signals to identify said index mark.

6. An automatic fabric washing machine having a stationary housing and a tub assembly including a non-rotatable outer tub, an inner tub rotatably nested therein for receiving fabrics to be treated, a fabric agitator operable within the inner tub and further having apparatus for analyzing and controlling the dynamic eccentricity of the tub assembly with respect to a design rotational axis thereof when subjected to dynamicly unbalanced forces of unevenly distributed fabrics in said inner tub during rotation thereof, comprising: indicator means rotatable with said rotatable inner tub, said indicator means including a predetermined detectable pattern located about said design rotational axis of said rotatable inner tub and said indicator means, said predetermined detectable pattern arranged to divide said indicator means into a first plurality of sectors having a first detectable characteristic and into a second plurality of sectors having a second relatively different detectable characteristic; sensor means juxtaposed to said predetermined detectable pattern and spaced a predetermined radial distance from said design rotational axis, said sensor means cooperable with said predetermined detectable pattern for producing an electrical signal corresponding to passage of said detectable pattern during rotary movement of said indicator means to generate a stream of electrical signals representative of the relative degree of radial displacement of said rotatable inner tub from said design rotational axis; and control means including circuit means having microcontroller means in circuit association with said sensor means, said microcontroller means operable for receiving and analyzing said stream of electrical signals for determining the radial displacement of said rotatable inner tub from said design rotational axis to locate the unbalanced axis of rotation and for initiating the modification of said rotary movement of said inner tub responsive to changes in said radial displacement exceeding a predetermined distance to limit the maximum rotational eccentricity of said tub assembly.

7. An automatic fabric washing machine as defined in claim 6 wherein one of said first or second plurality of sectors defines an index mark and wherein said microcontroller means is further operable for determining the angle defined by said index mark and by a line extending between said design rotational axis and said unbalanced axis of rotation.

8. An automatic fabric washing machine as defined in claim 6 wherein said microcontroller means is further operable for initiating a control signal to terminate operation of said washing machine responsive to radial displacement of said rotatable inner tub exceeding predetermined limits at a predetermined speed.

9. In a laundry appliance including a stationary housing and a rotatable fabric container for receiving fabrics to be treated, a method of analyzing the rotational eccentricity of said rotatable fabric container with respect to a design rotational axis thereof when subjected to dynamicly unbalanced forces of unevenly distributed fabrics in said fabric container during rotation thereof, comprising the steps of: rotating said rotatable fabric container and an indicator means having a predetermined detectable pattern about said design rotational axis; producing an electrical signal corresponding to passage of said predetermined detectable pattern during rotary movement of said indicator means by way of a sensor juxtaposed to said predetermined detectable pattern; generating a stream of electrical signals through said sensor representative of the relative degree of radial displacement of an unbalanced rotational axis of said rotatable fabric container from said design rotational axis; feeding said stream of electrical signals to a microcontroller in circuit association with said sensor; analyzing said stream of electrical signals for determining the radial displacement of said unbalanced rotational axis from said design rotational axis; and controlling rotary movement of said rotatable fabric container responsive to changes in said radial displacement of more than a predetermined distance to limit the maximum rotational eccentricity of said fabric container.

10. In an automatic fabric washing machine having a stationary housing and a tub assembly including a non-rotatable outer tub, an inner tub rotatably nested therein for receiving fabrics to be treated, a fabric agitator operable within the inner tub, a method of analyzing and controlling the eccentricity of the tub assembly with respect to a design rotational axis thereof when subjected to dynamicly unbalanced forces of unevenly distributed fabrics in said inner tub during rotation thereof, comprising the steps of: rotating said inner tub and an indicator means having a predetermined detectable pattern about said design rotational axis; producing an electrical signal corresponding to passage of said predetermined detectable pattern during rotary movement by way of a sensor juxtaposed to said predetermined detectable pattern; generating a stream of electrical signals through said sensor representative of the relative degree of radial displacement of an unbalanced rotational axis of said inner tub from said design rotational axis; feeding said stream of electrical signals to a microcontroller in circuit association with said sensor; analyzing said stream of electrical signals for determining the radial displacement of said unbalanced rotational axis from said design rotational axis; and controlling rotary movement of said inner tub responsive to changes in said radial displacement exceeding predetermined limits at predetermined rotational speeds of said inner tub.

11. A laundry appliance having a stationary housing and a rotatable fabric container for receiving fabrics to be treated and including apparatus for analyzing the rotational characteristics of the rotatable fabric container with respect to a design rotational axis thereof, comprising: indicator means rotatably associated with said rotatable fabric container and including a predetermined detectable pattern located about the design rotational axis of said rotatable fabric container; sensor means juxtaposed to said predetermined detectable pattern and spaced a predetermined radial distance from said design rotational axis, said sensor means cooperable with said predetermined detectable pattern for producing an electrical signal corresponding to passage of said predetermined detectable pattern during rotary movement of said rotatable fabric container and said indicator means to generate a stream of electrical signals representative of said rotational characteristics; and control means including circuit means having microcontroller means in circuit association with said sensor means, said microcontroller means operable for receiving and analyzing said stream of electrical signals for determining said rotational characteristics and further operable for controlling rotary movement of said rotatable fabric container responsive to changes in said rotational characteristics.

* * * * *

UNITED STATES PATENT AND TRADEMARK OFFICE
CERTIFICATE OF CORRECTION

PATENT NO. : 4,677,291

DATED : June 30, 1987

INVENTOR(S) : David I. Ellingson

It is certified that error appears in the above-identified patent and that said Letters Patent is hereby corrected as shown below:

Pat. Ref.

| | |
|---|---|
| Col. 2, line 24 | "to", second occurrence, should be -- of --. |
| Col. 3, line 53 | "predtermined" should be -- predetermined -- |
| Col. 4, line 7 | "tube" should be -- tub -- |
| Col. 4, line 15 | "snesor" should be -- sensor -- |
| Col. 5, line 15 | "sprinning" should be -- spinning -- |
| Col. 8, line 42 | "arcten" should be -- arctan -- |
| Col. 8, line 55 | "by" should be -- be -- |
| Col. 9, line 18 | "dynamicly unbalanced" should be -- the dynamic unbalance -- |
| Col. 10, lines 1 & 2 | "dynamicly unbalanced" should be -- the dynamic unbalance -- |
| Col. 10, line 51 | "dynamicly unbalanced" should be -- the dynamic unbalance -- |
| Col. 11, line 12 | "dynamicly unbalanced" should be -- the dynamic unbalance -- |

Signed and Sealed this

First Day of December, 1987

Attest:

DONALD J. QUIGG

*Attesting Officer*      *Commissioner of Patents and Trademarks*